(12) United States Patent
Cultraro (10) Patent No.: US 8,695,767 B2
(45) Date of Patent: Apr. 15, 2014

(54) DEVICE FOR BRAKING THE MOVEMENT OF A MOVABLE MEMBER WITH RESPECT TO A SUPPORT STRUCTURE

(76) Inventor: Antonino Cultraro, Rivoli (IT)

( * ) Notice: Subject to any disclaimer, the term of this patent is extended or adjusted under 35 U.S.C. 154(b) by 1275 days.

(21) Appl. No.: 12/281,114

(22) PCT Filed: Mar. 5, 2007

(86) PCT No.: PCT/IB2007/050705
§ 371 (c)(1),
(2), (4) Date: Aug. 28, 2008

(87) PCT Pub. No.: WO2007/102111
PCT Pub. Date: Sep. 13, 2007

(65) Prior Publication Data
US 2009/0255767 A1   Oct. 15, 2009

(30) Foreign Application Priority Data
Mar. 9, 2006 (IT) .............................. TO2006A0179

(51) Int. Cl.
*F16D 57/00* (2006.01)
(52) U.S. Cl.
USPC ....................................................... 188/290
(58) Field of Classification Search
USPC ......... 188/290, 292, 293, 294, 296, 306, 307, 188/308, 322.5; 16/51, 82
See application file for complete search history.

(56) References Cited

U.S. PATENT DOCUMENTS

| 5,152,189 A * | 10/1992 | Miura et al. ................... 464/180 |
| 6,213,881 B1 * | 4/2001 | Sasa et al. ........................ 464/24 |
| 6,866,588 B2 * | 3/2005 | Doornbos ........................ 464/40 |

FOREIGN PATENT DOCUMENTS

| AT | 393 005 B | 12/1990 |
| DE | 296 04 260 U1 | 6/1996 |
| DE | 297 15 912 U1 | 12/1997 |
| EP | 0 524 607 A1 | 1/1993 |
| EP | 1 413 794 A2 | 4/2004 |
| EP | 1 457 704 A1 | 9/2004 |
| FR | 2 606 846 A1 | 5/1988 |
| JP | 63-231029 A | 9/1988 |

\* cited by examiner

*Primary Examiner* — Bradley King
*Assistant Examiner* — Vu Q Nguyen
(74) *Attorney, Agent, or Firm* — Hayes Soloway P.C.

(57) ABSTRACT

A device for braking the movement of a movable member with respect to a support structure includes a casing fixable to the movable member or to the structure and defining a chamber containing a viscous braking fluid, and a rotor, operationally associable with the movable member or with the structure, and which is rotatably connected to the casing and is mounted thereon so as to close the chamber. The rotor includes a piston-like member or portion, mounted so as to slide within the chamber in such a way as to separate the chamber into separate regions in mutual fluid communication. The piston-like member or portion is movable integrally with the rotor, such that rotation of the rotor brings about a rotatory displacement of the piston-lie member or portion, braked by the resistance to the passage of the fluid from one region to the other of the chamber caused by the displacement of the piston-like member or portion.

16 Claims, 9 Drawing Sheets

FIG.15

DEVICE FOR BRAKING THE MOVEMENT OF A MOVABLE MEMBER WITH RESPECT TO A SUPPORT STRUCTURE

BACKGROUND OF THE INVENTION

The present invention relates to a device for braking the movement of a movable member with respect to a support structure.

A device of this type is known for example from German Utility Model DE 296 04 260 U1, which describes a tilting handle provided with a handgrip articulated on a mounting wall of a vehicle. The handgrip is rotatable against the action of resilient means from a rest position, close to the mounting wall, to an operating position. The handgrip is brought automatically from the operating position to the rest position after being released by the user. The return movement to the rest position is made softer by a braking device which acts on the axis of rotation of the handgrip.

The braking device is produced as a rotary damper, comprising a cylindrical casing, which defines within it an annular chamber filled with a viscous medium, a rotor mounted in a sealed manner on the casing and rotatable in the annular chamber, and a central through-opening, which is provided in the casing, and within which the axis of rotation of the handgrip is arranged.

The conventional rotary dampers normally used in the above-mentioned application do not, in reality, make it possible to obtain very high braking torques (customarily not more than a few N·cm), which limits their range of use. Moreover, the braking action on the rotor is developed not only by the viscous fluid contained in the device, but also to a large extent by the sealing O-rings interposed between the rotor and the casing, which makes the performance of the device substantially dependent on the operating temperature and percentage of humidity.

It is an aim of the present invention to provide a braking device of compact dimensions which makes it possible to obtain substantially higher braking torques than the prior art, without exhibiting the problems of reliability described above.

SUMMARY OF THE INVENTION

This aim is achieved according to the invention by a device for braking the movement of a movable member with respect to a support structure.

In such a device, the braking action on the device derives from the effect of the resistance which the viscous fluid offers to the rotational movement of a piston-like member or portion. This causes the O-rings arranged in the device predominantly to perform a sealing function, without having a substantial influence on the braking performance.

Advantageously, the type of movement provided for in the device according to the invention makes it possible to predetermine an end stop incorporated in the device, which is not possible in the rotational devices of known type.

BRIEF DESCRIPTION OF THE DRAWINGS

Other characteristics and advantages of the device according to the invention will become clearer from the following detailed description of an embodiment of the invention which is given with reference to the appended drawings which are provided purely by way of non-limiting example and in which.

DETAILED DESCRIPTION OF THE INVENTION

The drawings illustrate a braking device 10, produced as a rotary damper, adapted to being fitted for example to a tilting handle M (illustrated in FIG. 1), mounted on a wall W inside the passenger compartment of a vehicle. The handgrip of the handle is rotatable against the action of resilient means E from a rest position to a use position. After being released by the user, the handgrip is then brought automatically from the use position to the rest position. The device 10 serves to slow down the return movement of the handle. In particular, as will be explained hereinafter, the device illustrated in the drawings is adapted to be mounted at the axis of rotation or hinge axis x of the aforesaid handle.

s can be seen from FIGS. 2 to 6, the device 10 comprises a casing 12 on which a rotor 14 is mounted. The casing 12 is substantially cylindrical and has a central through-opening 15 (illustrated in FIGS. 4 to 6), which allows the device to be mounted on the axis of rotation x of the handle M, in a manner similar to that illustrated in Utility Model DE 296 04 260 U1.

Figure 4:
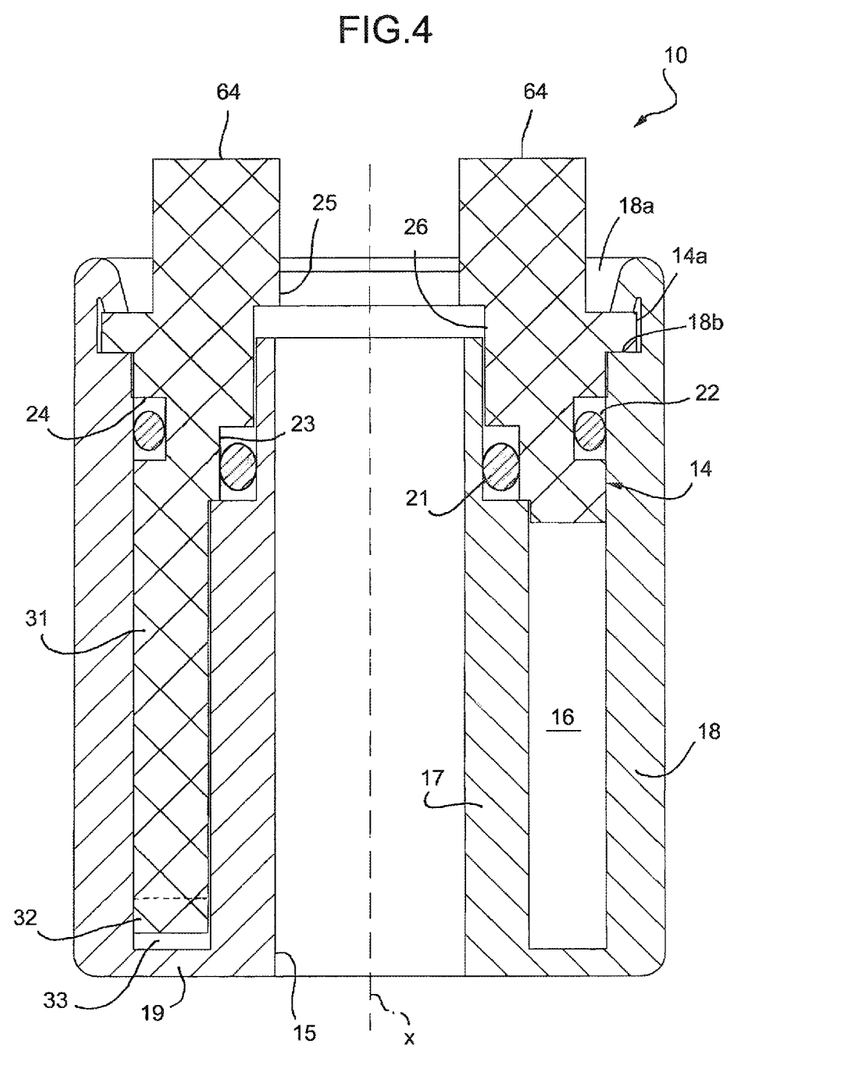
FIG. 4 is a view in longitudinal section of the device of FIG. 2, along the line IV-IV of that figure.
Figure 5:
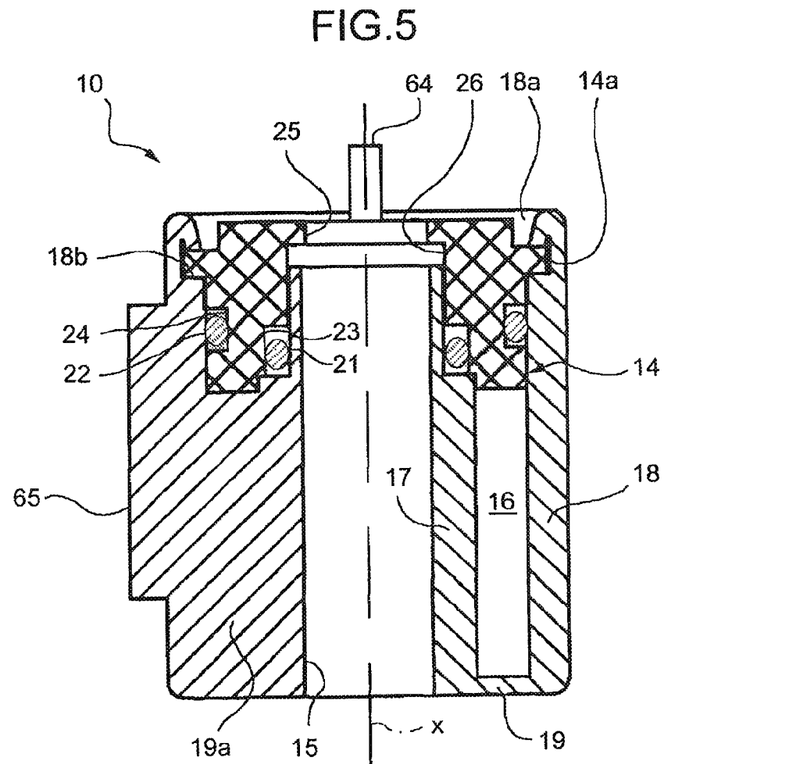
FIG. 5 is a view in longitudinal section of the device of FIG. 2, along the line V-V of that figure.
Figure 6:
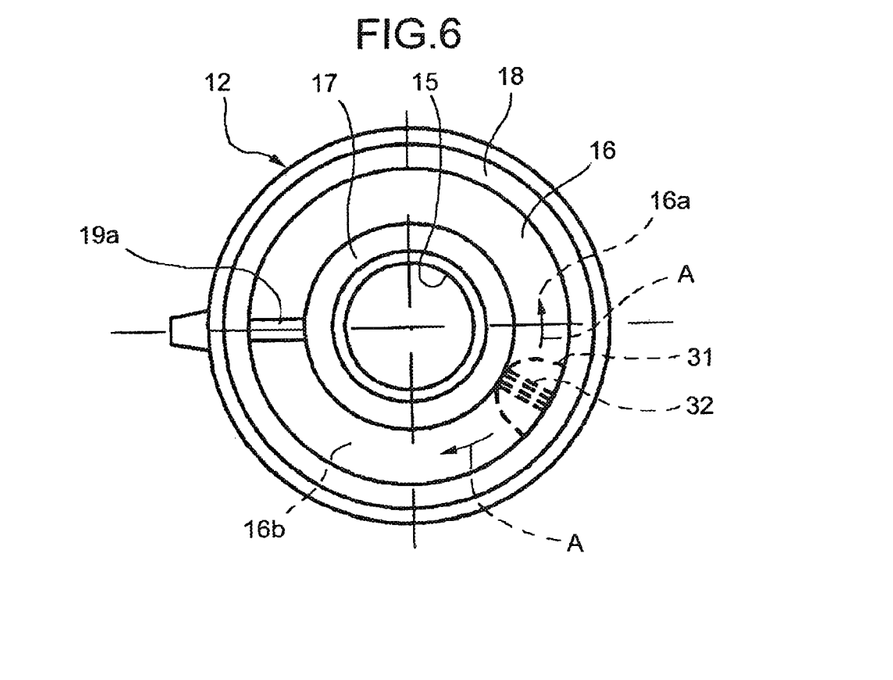
FIG. 6 is a plan view of a casing of the device of FIG. 2, before the assembly of the device.

As can be seen in FIGS. 4 to 6, the casing 12 defines an annular chamber 16 coaxial with the central opening 15 and containing a viscous fluid, for example silicone oil. The annular chamber 16 is bounded laterally by a radially inner wall 17 and by a radially outer wall 18, and is closed at one end by an end wall 19. The annular chamber 16 is in the shape of an open ring, and is therefore bounded, in the circumferential direction of the ring, by a meridian partition 19a, visible in FIGS. 5 and 6, extending in a meridian plane passing through the axis of rotation x. In this embodiment, the meridian partition 19a is formed by a rigid wall, produced in one piece with the radially inner wall 17, the radially outer wall 18 and the bottom wall 19 of the casing 12.

The end of the annular chamber 16 opposed to the end wall 19 is open, and from that end the radially outer wall 18 has an edge with a mouth 18a in which the radially outer wall 18 is folded towards the inside of the chamber 16, for example by hot or ultrasound riveting. In a position adjacent to the mouth 18a, a shoulder 18b is provided on the inner surface of the radially outer wall 18.

With such an arrangement, the casing 12 holds the rotor 14 axially, so that this is capable of closing the annular chamber 16. The rotor 14 in fact has a flange 14a provided on its radially outer surface, intended to be engaged axially between the shoulder 18b and the folded-back mouth 18a of the casing 18. The type of mounting of the rotor 14 on the casing 18 is not, of course, essential to the purposes of the invention, provided that it allows relative rotation between them.

The leaktight seal of the closure of the annular chamber 16 is guaranteed by a pair of O-rings 21, 22. One O-ring 21 is housed in a corresponding seat 23 provided on the radially inner wall 17 of the casing 12, and is interposed between the radially inner wall 17 and a radially inner surface of the rotor 14, so as to provide a radial seal. The other O-ring 22 is housed in a corresponding seat 24 provided on the radially outer surface of the rotor 14, and is interposed between the radially outer surface and the radially outer wall 18 of the casing 12, so as to provide a radial seal.

The alignment and centring of the rotor 14 with respect to the chamber 16 of the casing 12 is guaranteed by the lateral walls 17 and 18 of the casing 12. In particular, the radially inner wall 17 of the casing 12 defines the rotation shaft of the rotor 14. In the rotor 14 a through hole 25 is provided, intended to receive the axis of rotation x of the movable member to which the device 10 is connected. The through hole 25 has a cross-section 26 of enlarged diameter, intended to receive the radially inner wall 17 of the casing 12 acting as a rotation shaft. In the drawings, the arrows A indicate the directions of rotation of the rotor 14 with respect to the casing 12.

Figure 7:
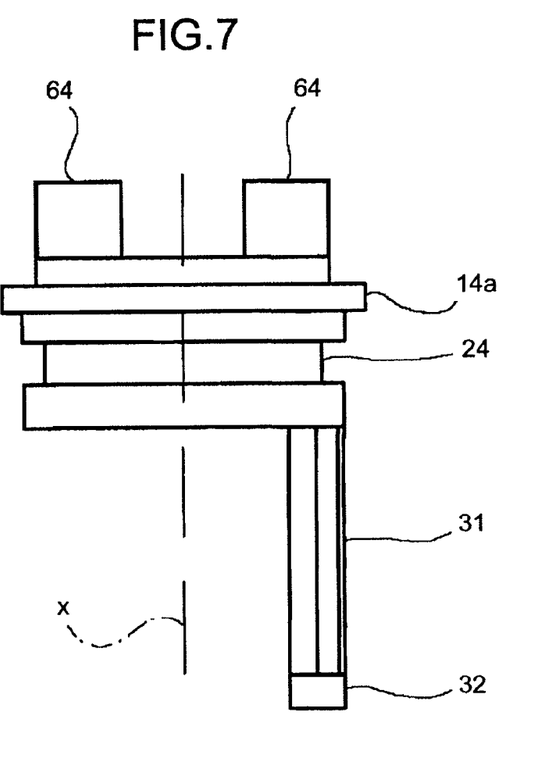
FIG. 7 is a view in side elevation of a rotor of the device of FIG. 2.
Figure 8:
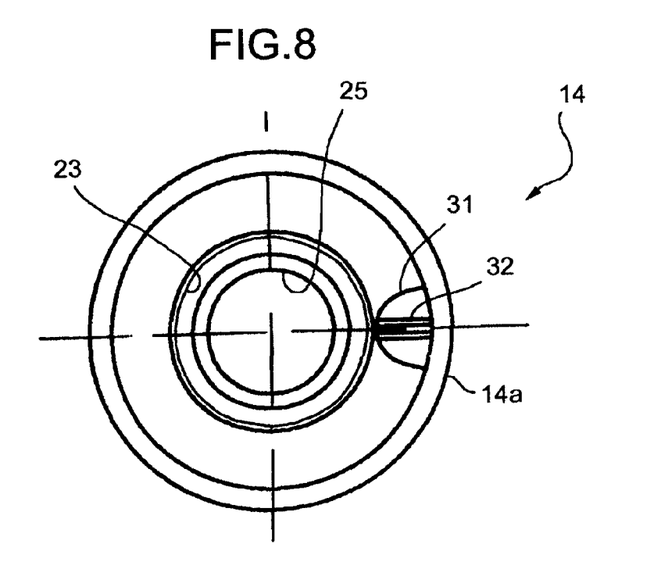
FIG. 8 is a plan view from below of the rotor of FIG. 7.
Figure 9:
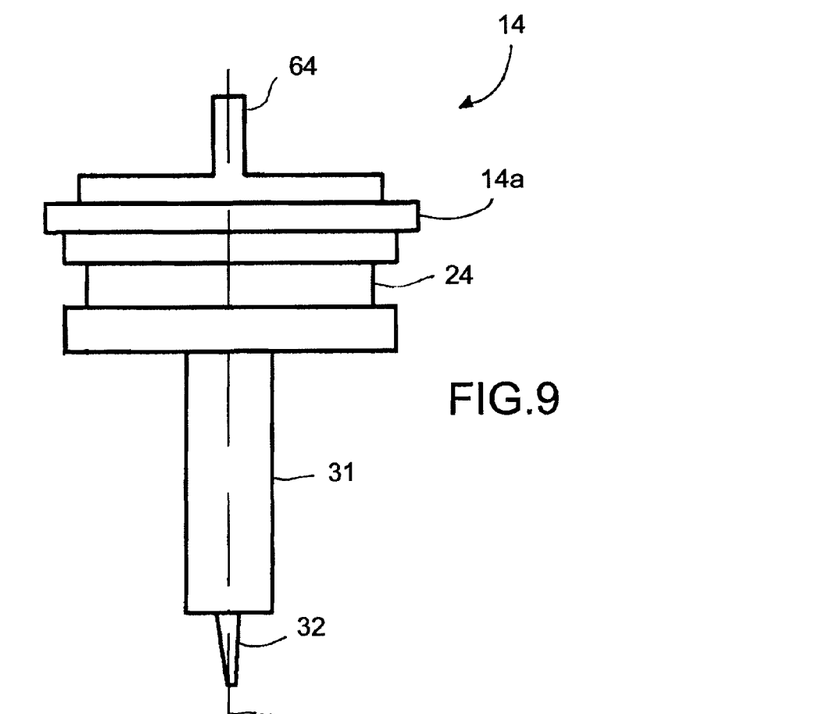
FIG. 9 is another view in side elevation of the rotor of FIG. 7.

Referring also to FIGS. 7 to 9, the rotor 14 further has an elongate portion 31 produced in one piece with the rotor 14, extending in the direction of the axis x and arranged so as to be received within the annular chamber 16 when the rotor 14 is assembled to the casing 12. In an alternative embodiment, not illustrated, the elongate portion 31 may be substituted by an elongate member rigidly connected to the rotor 14.

The elongate portion 31 is connected by one of its ends to the remainder of the body of the rotor 14, and at the other has a fin 32 having a tapered plate-like shape, this also extending in the direction of the axis x. The length of the elongate portion 31, including the fin 32, is such that, in the assembled state of the braking device 10, the free end of the fin 32 reaches a predetermined distance from the inner surface of the bottom wall 19 of the casing 12, so as to define therewith a passage opening 33.

The elongate portion 31 has in general, in a plane passing through the axis of rotation x, a longitudinal section shaped so as to block, except for sizing tolerances, the meridian section of the annular chamber 16, except for the passage opening 33 defined by the end fin 32 in co-operation with the radially outer wall 18, the radially inner wall 17 and the bottom wall 19 of the casing 12.

In addition, the elongate portion 31 has a cross-section substantially in the shape of a sector of a circular crown (visible in particular in FIG. 8).

Because of the arrangement described herein, rotation of the rotor 14 with respect to the casing 12 brings about the rotatory displacement of the elongate portion 31 along the annular chamber 16 and within the latter.

As stated above, the elongate portion 31 of the rotor 14 is of such dimensions that it does not completely block the meridian section of the chamber 16 of the casing 12, and at the end fin 32, leaves the passage opening 33 for the transfer of fluid.

In this way, the elongate portion 31 of the rotor 14 separates the annular chamber 16 into two end regions 16a and 16b arranged on circumferentially opposed sides of the elongate portion 31 of the rotor 14, which are in mutual fluid communication via the passage opening 33. For greater clarity, the end regions 16a and 16b are shown by dashed lines in FIG. 6, together with the elongate portion 31 of the rotor 14, this also being shown by dashed lines. The sliding of the elongate portion 31 of the rotor 14 in the chamber 16 therefore urges the viscous fluid contained in the chamber 16 to transfer forcibly from the chamber 16a to the chamber 16b or vice versa, via the passage opening 33. The elongate portion 31 of the rotor 14 then acts as a piston inside the annular chamber 16. The meridian partition 19a thus defines the end-of-stroke positions of the piston portion 31.

The elongate portion 31 of the rotor 14 is consequently braked by the viscous medium present in the chamber 16, and the braking effect depends both on the viscosity of the viscous fluid and on the dimensions of the passage opening 33, and therefore on the resistance offered by the passage opening 33 to the transfer of the fluid from one region 16a to the other 16b at the sides of the elongate protuberance 31 of the rotor 14. In this way it is possible definitively to regulate the braking torque of the device 10, since said torque, which opposes the rotation of the rotor 14 with respect to the casing 12, obviously depends on the movement of the elongate portion 31 of the rotor 14 in the chamber 16. The Applicant has, for example, produced a device of the type described above, having an overall diameter of around 1.3 cm and an overall height of around 1.6 cm., capable of exerting a braking torque of up to several tens of N·cm.

The device according to the invention is preferably produced from plastics material. It may be without the central through hole 15, utilising external coupling systems and/or shaped blind holes; this permits smaller overall radial dimensions.

As may be appreciated, the O-rings 21 and 22 exert almost solely a sealing action, while they have no braking action relating to the movement of the device. This means that the physical characteristics of the O-rings, sensitive to temperatures and humidity, cannot alter the braking performance of the device.

The type of connection of the device to the bodies between which braking of the relative movement is desired may be of any type known to an expert in the field, according to the different requirements for application. In the examples illustrated in the drawings, in which the device is intended to be applied to a tiltable handle mounted in an automotive vehicle, the characteristics intended for connection are produced in a similar manner to that described in German Utility Model DE 296 04 260 U1. Namely, the front end of the rotor 14, emerging from the casing 12, has two tongues 64 extending in diametrically opposed radial directions, while the radially outer wall 18 of the casing 12 has a tongue 65 extending in the axial direction of the casing 12. The tongues 64 and 65 are intended to engage corresponding mounting seats (not shown) provided respectively in the tiltable handle M and in the support wall W for the handle. The device in the form described above is intended to be arranged at the axis of rotation x of the handle. However, it is possible to envisage other arrangements of the device, depending on the type of application: for example, an arrangement in which a gearwheel is integral with the rotor, and the gearwheel engages a rack integral with a movable member the movement of which is to be slowed down, according to a configuration of the type normally used for example in doors or drawers of audio and/or video reproducing/recording equipment or instrument panels of automotive vehicles.

Figure 10:
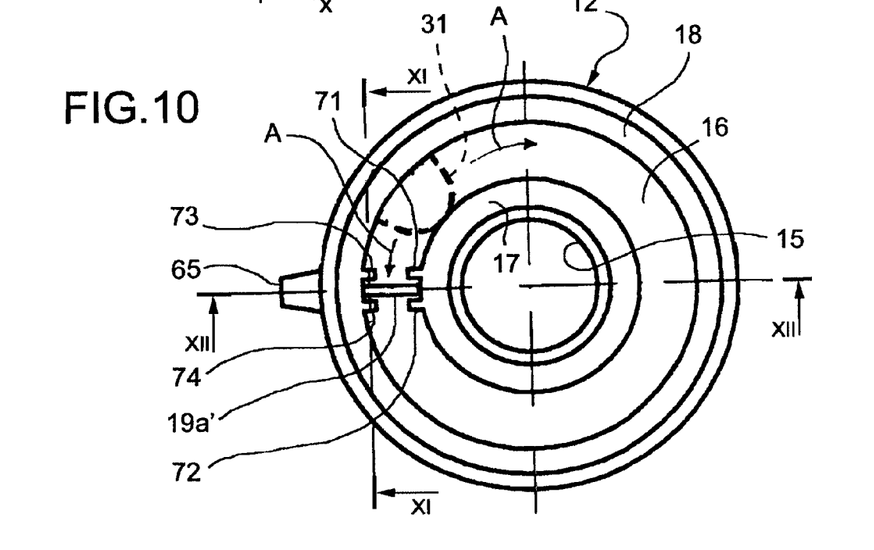
FIG. 10 is a plan view of a casing of a first variant of the device of FIG. 2, before assembly.
Figure 11:
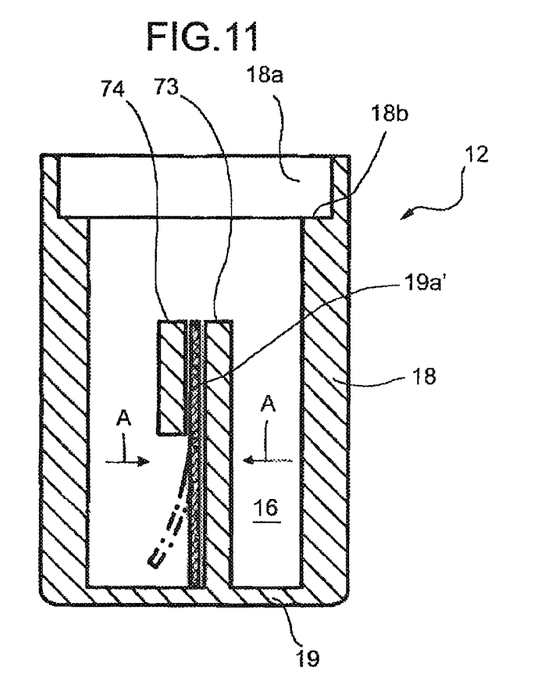
FIG. 11 is a view in longitudinal section of the casing of FIG. 10, along the line XI-XI of that figure.
Figure 12:
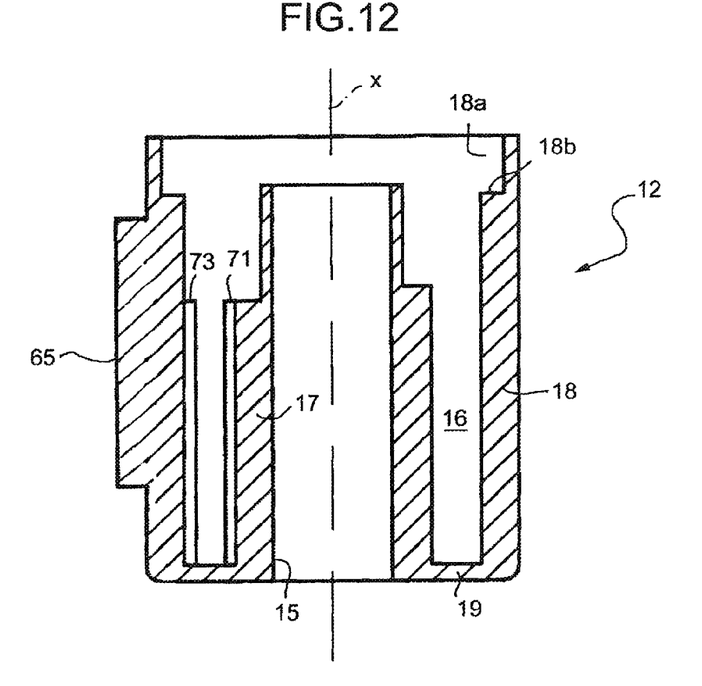
FIG. 12 is a view in longitudinal section of the casing of FIG. 10, along the line XII-XII of that figure.

In the device described above, the braking action exerted by the viscous fluid is substantially identical in both directions of displacement of the elongate portion 31 of the rotor 14, and therefore in both directions of rotation of the rotor. In applications in which a different braking action for the two directions is required, it is possible to adopt the variant illustrated in FIGS. 10, 11 and 12. The characteristics of the device of FIGS. 10 to 12 identical to those of the device described previously have been indicated by the same reference numbers. The device differs in that the meridian partition 19a is formed by a flexible tongue 19a' of resilient material. The flexible tongue 19a' is mounted, on radially opposed sides, between a pair of strip-like portions 71, 72 provided integrally on the radially inner wall 17 of the casing 12, and between a pair of strip-like portions 73, 74 provided integrally on the radially outer wall 18 of the casing 12. FIG. 11 shows in section the pair of strip-like portions 73, 74 provided integrally on the radially outer wall 18 of the casing 12. The arrangement of the pair of strip-like portions 71, 72 provided integrally on the radially inner wall 17 of the casing 12 is identical to that illustrated in FIG. 11. As can be seen, on one side (with respect to the circumferential direction of the chamber 16) of the flexible tongue 19a' the strip-like portions 71 and 73 extend for the entire height of the annular chamber 16, while on the other side (with respect to the circumferential direction of the chamber 16) of the flexible tongue 19a' the strip-like portions 72 and 74 extend for only a part of the height of the annular chamber 16, namely that nearest to the rotor 14. In this way, the flexible tongue 19a' is able to flex in its end portion nearest to the bottom wall 19 of the casing 12, as indicated by a dash-dotted line in FIG. 11, and on only one side with respect to the circumferential direction of the chamber 16.

The braking action of the device therefore differs according to the direction of rotation of the elongate portion 31 of the rotor 14.

In the clockwise direction of rotation (according to the arrangement of FIG. 10) of the rotor 14, the flexible tongue 19a', being urged by the action of the fluid compressed by the elongate portion 31 of the rotor 14, is pressed against the long strip-like portions 73 and 71 of the radially outer wall 18 and of the radially inner wall 17 of the casing 12, maintaining a substantially rigid behaviour.

In the anticlockwise direction of rotation of the rotor 14, the flexible tongue 19a' flexes at the end through the action of the fluid compressed by the elongate portion 31 of the rotor 14, moving away, therefore, from the long strip-like portions 71 and 73, since the short strip-like portions 72 and 74 provide a support surface only for a part of the flexible tongue 19a'. In this movement, the movable end of the flexible tongue 19a' creates a passage for the fluid between it and the bottom wall 19 of the casing 12. This reduces the resistance opposed by the compressed fluid to the anticlockwise movement of the elongate portion 31 of the rotor 14, which will consequently be slowed down in an attenuated manner with respect to its clockwise movement. Obviously, by reversing in the casing 12 the arrangement of the long strip-like portions 71 and 73 and of the short strip-like portions 72 and 74 it is possible to reverse the unidirectional effect in the opposite direction.

Figure 2:
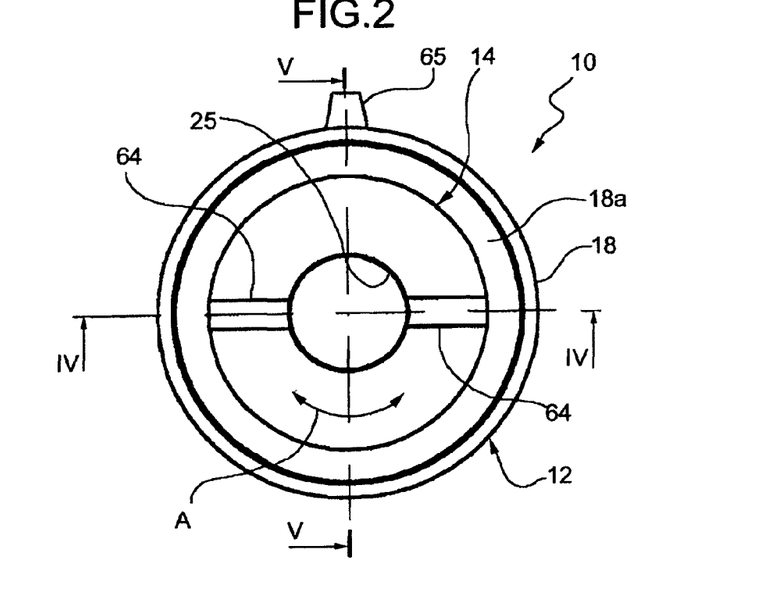
FIG. 2 is a plan view of a braking device according to the invention.
Figure 3:
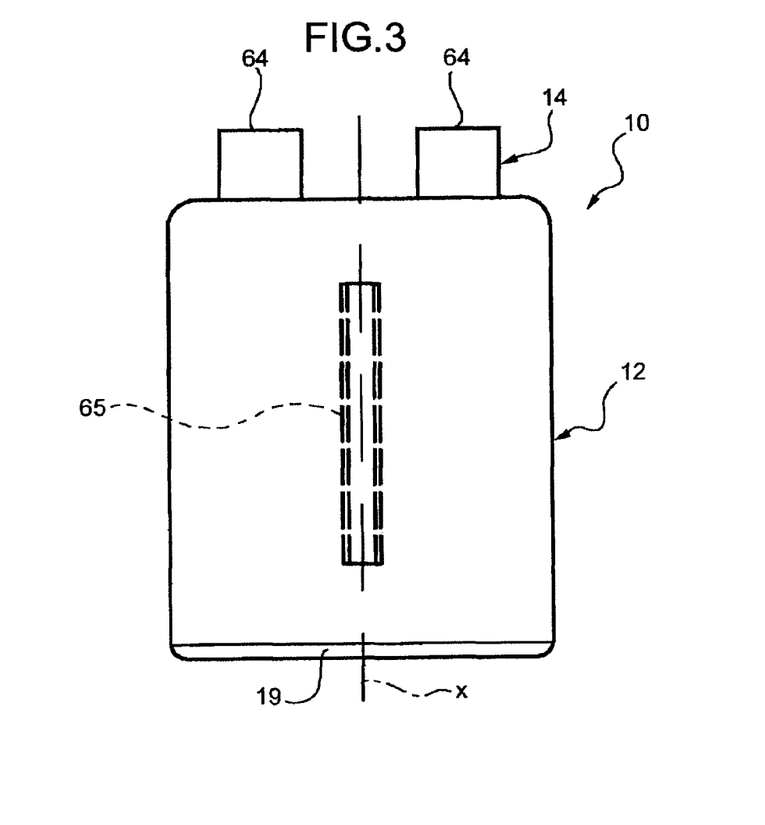
FIG. 3 is a view in side elevation of the device of FIG. 2.
Figure 13:
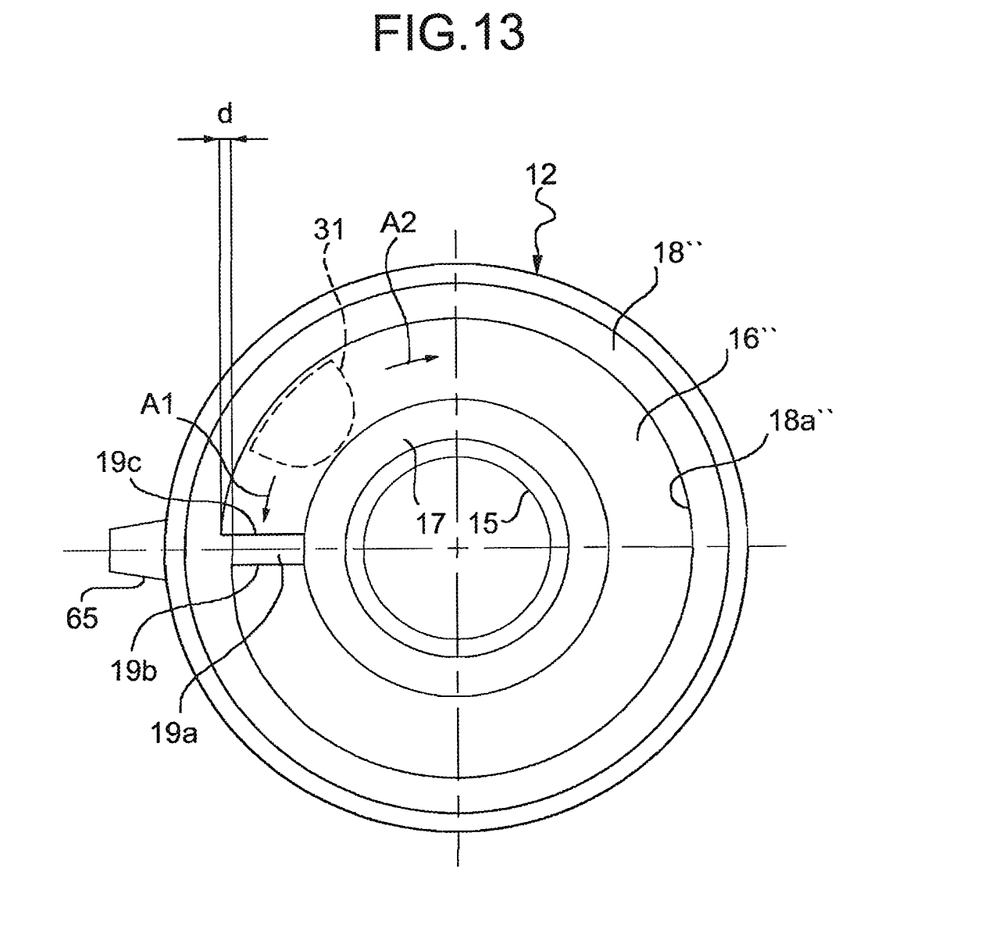
FIG. 13 is a plan view of a casing of a second variant of the device of FIG. 2, before assembly.

FIG. 13 shows a second variant of the device of FIG. 2. The characteristics of the device of FIG. 13 identical to those of the preceding device of FIG. 2 have been indicated by the same reference numbers. The device differs from the preceding solution in that it defines an annular chamber 16" which, compared to the annular chamber 16 of the device of FIG. 2, has a width in the radial direction which varies in the circumferential direction of the annular chamber 16". In the example illustrated, this is obtained by the fact that the casing 12 has a radially outer wall 18" having a thickness which varies in the circumferential direction of the annular chamber 16", while the thickness of the radially outer wall 18 of the casing 12 of the solution in FIG. 2 was constant in the circumferential direction of the annular chamber 16. More particularly, the radially outer wall 18" has a radially inner surface 18a" the profile of which, in the transverse plane of FIG. 13, substantially follows the course of one turn of a spiral. Thus, the annular chamber 16" has a minimum width at one side 19b of the meridian partition 19a, and a maximum width at the opposite side 19c of the meridian partition 19a. The difference d between the maximum width and the minimum width is equal to a predetermined value, and is indicated in FIG. 13.

The rotor intended to be coupled to the casing 12 illustrated in FIG. 13 is the same as that illustrated with reference to FIGS. 2 to 9. FIG. 13 shows diagrammatically by a dashed line the elongate portion 31 of the rotor, intended to rotate in the chamber 16". In a direction of rotation A1, which is anticlockwise in the drawing, the elongate portion 31 of the rotor slides inside the chamber 16", the overall meridian section of which increases progressively. Therefore, the braking action exerted by the viscous fluid decreases progressively, since in addition to the passage 33 at the end of the elongate portion 31 there is also a lateral passage of increasing width between the elongate portion 31 and the radially inner surface 18" of the radially outer wall 18". In a direction of rotation A2, which is clockwise in the drawing, the elongate portion 31 of the rotor slides inside the chamber 16", the overall meridian section of which decreases progressively. Therefore, the braking action exerted by the viscous fluid increases progressively, since the lateral passage between the elongate portion 31 and the radially inner surface 18a" of the radially outer wall 18", has a width decreasing until it is substantially zero.

Figure 1:
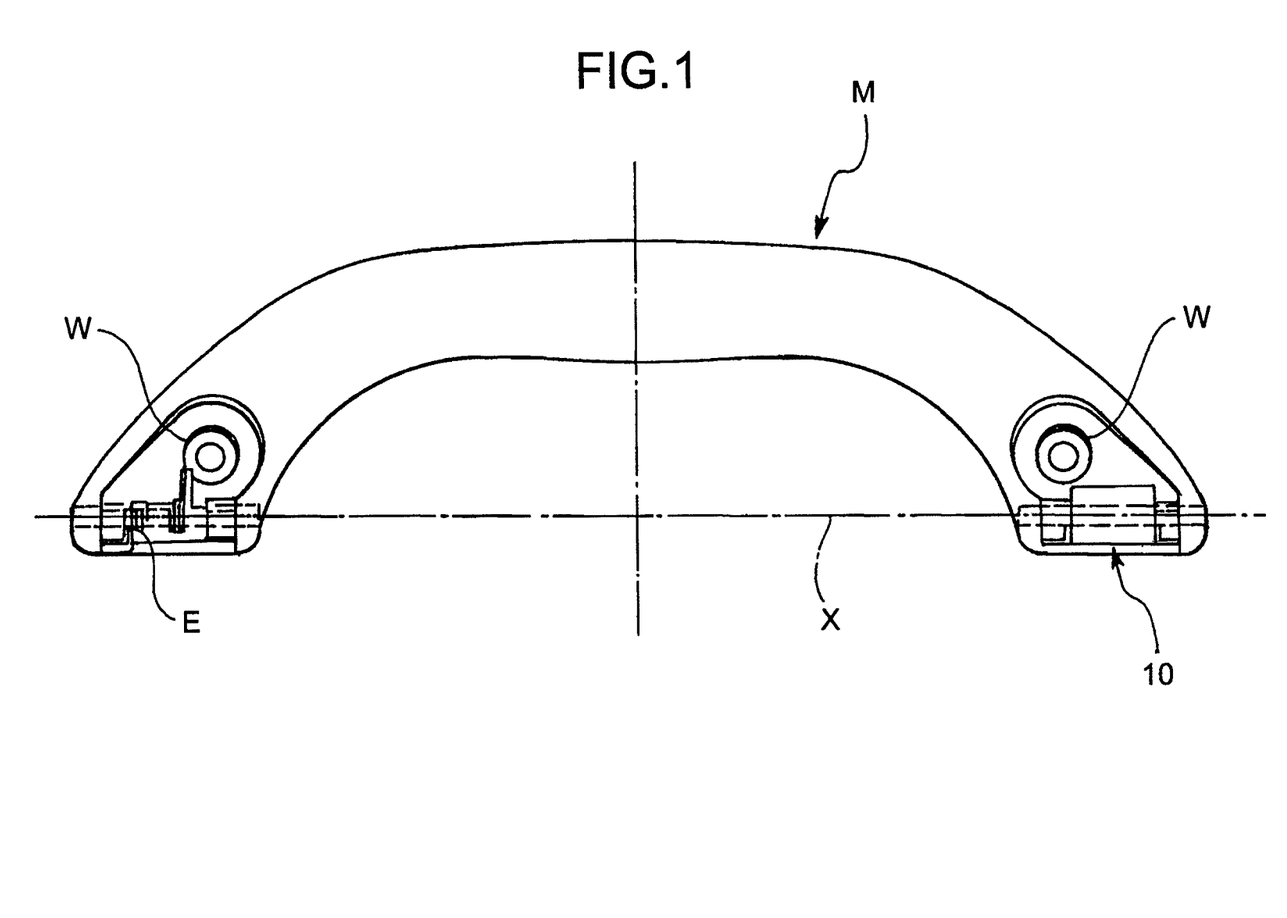
FIG. 1 is a diagrammatic view of a handle provided with a braking device.

The device described with reference to FIG. 13 makes it possible to compensate at least in part for the variation of the resilient force applied to the part in motion which is to be slowed down, for example the handle M of FIG. 1. In particular, the device is particularly adapted to compensate for a resilient force which is maximum at one end-of-stroke position, and is minimum in the other end-of-stroke position of the part in motion.

Figure 14:
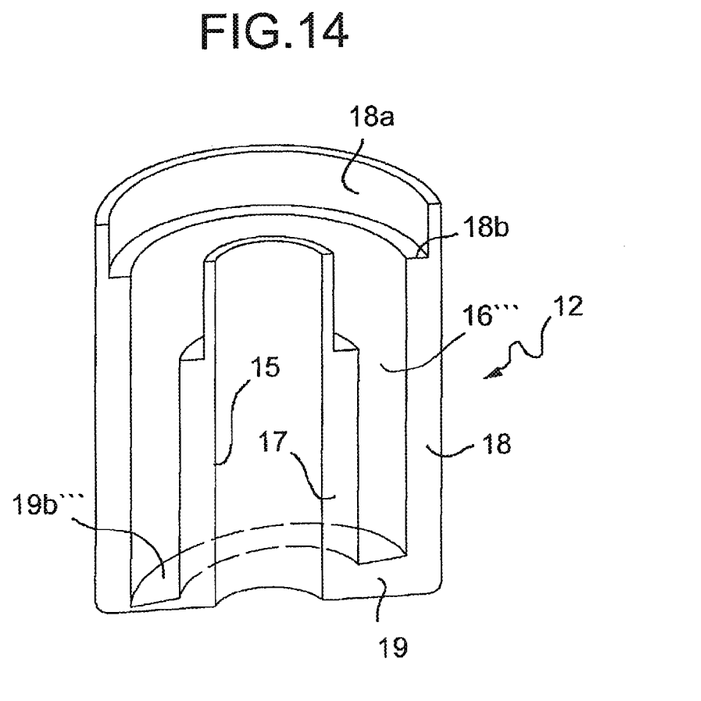
FIG. 14 is an exposed view of a casing of a third variant of the device of FIG. 2, before assembly.
Figure 15:
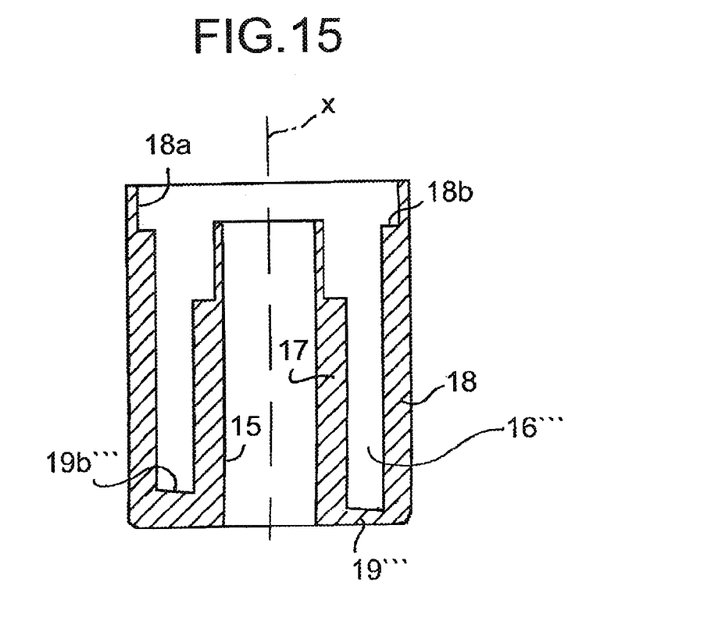
FIG. 15 is a view in longitudinal section of the casing of FIG. 14.

The resilient force may also be compensated with the third variant of the device illustrated in FIGS. 14 and 15. The characteristics of the device of FIGS. 14 and 15 identical to those of the preceding device of FIG. 2 have been indicated by the same reference numbers. The device differs from the preceding solution in that it defines an annular chamber 16''' which, compared to the annular chamber 16 of the device of FIG. 2, has an amplitude in the axial direction which varies in the circumferential direction of the annular chamber 16'''. In the example illustrated, this is obtained by the fact that the casing 12 has a bottom wall 19''' having a thickness which varies in the circumferential direction of the annular chamber 16''', while the thickness of the bottom wall 19 of the casing 12 of the solution in FIG. 2 was constant in the circumferential direction of the annular chamber 16. More particularly, the bottom wall 19''' has an axially inner surface 19b''' which is defined by a plane inclined with respect to the state orthogonal to the axis x. Thus, the annular chamber 16''' has a minimum meridian section at the highest point of the axially inner surface 19b''', and a maximum meridian section at the lowest point of the axially inner surface 19b'''.

The rotor intended to be coupled to the casing 12 illustrated in FIGS. 14 and 15 is the same as that illustrated with reference to FIGS. 2 to 9. In a direction of rotation which brings the elongate portion 31 of the rotor, sliding inside the chamber 16''', to lie above the lowest point of the axially inner surface 19b''', the overall meridian section exhibited by the chamber 16''' increases progressively. Therefore, the braking action exerted by the viscous fluid decreases progressively, since the passage 33 at the end of the elongate portion 31 between the elongate portion 31 and the axially inner surface 19b''' of the bottom wall 19''' tends to widen out axially. In a direction of rotation which brings the elongate portion 31 of the rotor to lie above the highest point of the axially inner surface 19b''', the overall meridian section exhibited by the chamber 16''' decreases progressively. Therefore, the braking action exerted by the viscous fluid increases progressively, since the passage 33 at the end of the elongate portion 31 between the elongate portion 31 and the axially inner surface 19b''' of the bottom wall 19''' tends to narrow axially. By suitably arranging the axially inner surface 19b''' of the bottom wall 19''' with respect to the meridian partition 19a, this configuration is particularly suitable for compensating a resilient force which has a maximum or a minimum at an intermediate position between the two end-of-stroke positions of the part in motion.

It is to be understood that the invention is not limited to the embodiments described and illustrated herein, but is capable of modifications relating to shape and arrangements of parts, constructional and functional details. Although in the embodiments illustrated the opening 33 for the passage of fluid through the elongate portion 31 of the rotor 14 is arranged at the free end of the elongate portion 31, it is possible to envisage different passage arrangements. The Applicant has however found that the arrangement illustrated herein appears to be optimal from the point of view of reliability and of the performance of the braking device 10.

The invention claimed is:

1. A device for braking the movement of a movable member with respect to a support structure, comprising:
    a casing fixable to one of said movable member and structure and defining an annular chamber containing a viscous braking fluid, and
    a rotor, operationally associable with the other of said movable member and structure, and which is rotatably connected to said casing and is mounted thereon so as to close said chamber,
    wherein said rotor comprises a piston member or portion, mounted so as to slide within said chamber in such a way as to separate said chamber into separate regions in mutual fluid communication, said piston member or portion being movable integrally with said rotor, such that rotation of said rotor brings about a rotatory displacement of said piston member or portion, braked by a resistance to the passage of the fluid from one region to the other of said chamber caused by a displacement of the piston member or portion,
    wherein said annular chamber is bounded laterally by a radially inner and a radially outer wall of the casing and, in a circumferential direction of the annular chamber, by a meridian partition connecting the radially inner with the radially outer wall of the casing, and is closed at one end by an end wall of the casing,
    wherein said piston member or portion protrudes from said rotor in a direction of a rotation axis thereof and is interposed between said radially inner and radially outer wall of the casing,
    wherein said radially inner wall of the casing protrudes from said end wall of the casing towards said rotor, and extends as far as a position where said piston member or portion is connected to said rotor, and wherein said meridian partition protrudes from said end wall of the casing towards said rotor and extends as far as the position where said piston member or portion is connected to said rotor.

2. The device according to claim 1, wherein said piston member or portion has a longitudinal section shaped so as to substantially block a meridian section of the chamber, yet having at least one passage which permits fluid communication between said regions of the chamber.

3. The device according to claim 2, wherein said piston member or portion has a length, in the axial direction of the chamber, substantially equal to a height of the chamber, and has a fin end portion, defining said at least one passage in co-operation with walls of the chamber.

4. The device according to claim 3, wherein said at least one passage is arranged at one end of said fin end portion of the piston member or portion.

5. The device according to claim 4, wherein said fin end portion has a tapered plate shape.

6. A device according to claim 2, wherein said meridian partition (19a') is designed so as to permit the passage of fluid through it when said piston member or portion (31) moves in a predetermined direction of rotation of the rotor (14).

7. A device according to claim 6, wherein said meridian partition comprises a tongue of resilient material, said tongue being capable of flexing exclusively in said predetermined direction of rotation of the rotor (14).

8. A device according to claim 7, wherein said tongue is capable of flexing exclusively at an end portion thereof.

9. A device according to claim 8, wherein said tongue (19a') is mounted, on opposite sides, between respective pairs of strip portions (71, 72, 73, 74) provided integrally on walls (17, 18) of said chamber.

10. A device according to claim 2, wherein said chamber (16'') has width in the radial direction which varies in the circumferential direction of said chamber.

11. A device according to claim 10, wherein said casing (12) has a the radially outer wall (18''), bounding said chamber (16''), having a thickness which varies in the circumferential direction of said chamber (16'').

12. A device according to claim 11, wherein said radially outer wall (18'') has a radially inner surface (18a''), facing said chamber (16''), the profile of which, in a transverse plane, substantially follows the course of one turn of a spiral, and wherein said annular chamber (16'') has a minimum width at one side (19b) of said meridian partition (19a), and a maximum width at the opposite side (19c) of said meridian partition (19a).

13. A device according to claim 2, wherein, said chamber (16''') has an amplitude in the axial direction which varies in the circumferential direction of said annular chamber (16''').

14. A device according to claim 13, wherein said casing (12) has a bottom wall (19'''), bounding said chamber (16'''), and having a thickness which varies in the circumferential direction of said annular chamber (16''').

15. A device according to claim 14, wherein said bottom wall (19''') has an axially inner surface (19b'''), facing said chamber (16'''), which is defined by an inclined plane.

16. The device according to claim 1, wherein said piston member or portion is produced in one piece with said rotor.

* * * * *